UNITED STATES PATENT OFFICE.

RAYMOND B. PRICE, OF NEW YORK, N. Y., ASSIGNOR TO RUBBER REGENERATING COMPANY, A CORPORATION OF INDIANA.

TREATMENT OF PLASTIC MATERIAL.

1,161,965.  Specification of Letters Patent.  Patented Nov. 30, 1915.

No Drawing.   Application filed January 25, 1913.   Serial No. 744,254.

*To all whom it may concern:*

Be it known that I, RAYMOND B. PRICE, a citizen of the United States, residing in the borough of Manhattan, city of New York, State of New York, have invented new and useful Improvements in the Treatment of Plastic Material, of which the following is a specification.

My invention relates to the vulcanization of rubber, and has for its object to provide an improved process of vulcanizing the same whereby a better product will be produced.

In carrying out my process the stock to be treated is subjected to a minor heating action below the vulcanizing heat, and which may be applied to the material at or slightly above atmospheric pressure or under a vacuum, or under a combination of these conditions, in any desired order of application. Or I may, if desired, first apply the vacuum and then the minor heat, either while the vacuum is continued or after it is broken. Having applied this heat sufficiently to warm the stock throughout, I then introduce to the chamber containing the stock a vapor, such as superheated steam, for effecting the vulcanizing operation, which may be introduced at any desired temperature and at any desired pressure. It will be found that this preliminary warming of the material expands any gas or volatile matter therein, so that the application of a vacuum will more readily draw out the same. Said warming step also tends to flux the external surface of the material, and, further, and what is quite important, renders the material more receptive of the vulcanizing action of the steam by limiting its condensation.

It will be understood that when the vulcanization has been started by means of superheated steam, wet steam may be substituted without injuriously affecting the product, or wet steam or any other such medium may be used.

While I have described my process as primarily intended for use in vulcanizing rubber, it will be understood that the same may be applied to the treatment of other analogous substances, such as balata and the like.

Having thus described my invention, what I claim as new and desire to secure by Letters Patent is:

1. The process of vulcanizing rubber or the like which consists in preheating the material to be vulcanized by subjecting it to the action of heat below the vulcanizing temperature and to a reduced external pressure for a definite period of time, whereby entrapped fluids will be withdrawn therefrom, and thereafter subjecting the material to the action of a medium at a vulcanizing temperature.

2. The process of vulcanizing rubber or the like which consists in preheating the material to be vulcanized by subjecting it to the action of heat below the vulcanizing temperature and to a reduced external pressure for a definite period of time, whereby entrapped fluids will be expanded and withdrawn therefrom, and immediately thereafter subjecting the material while still heated to the action of a medium at a vulcanizing temperature.

3. The process of vulcanizing rubber or the like which consists in preheating the material to be vulcanized by subjecting it to the action of heat below the vulcanizing temperature, withdrawing therefrom the fluids entrapped therein, by subjecting the material to the action of a vacuum, and thereafter subjecting the material to the action of a medium at a vulcanizing temperature.

4. The process of vulcanizing rubber or the like which consists in preheating the material to be vulcanized by subjecting it to the action of heat below the vulcanizing temperature for a definite period of time, then subjecting the material to reduced external pressure, whereby expanded entrapped fluids will be withdrawn therefrom, and thereafter subjecting the material to the action of a dry vapor at a vulcanizing temperature.

5. The process of vulcanizing rubber or the like which consists in preheating the material to be vulcanized by subjecting it to the action of heat below the vulcanizing temperature, withdrawing therefrom the fluids entrapped therein by subjecting the material to the action of a vacuum and thereafter subjecting the material to the action of a dry vapor at a vulcanizing temperature.

In testimony whereof, I have hereunto set my hand in the presence of two subscribing witnesses.

RAYMOND B. PRICE.

Witnesses:
PERCY B. HILLS,
A. L. MILLS.